May 25, 1965
F. A. OMILIAN, JR
3,185,334
OPACIFIED POWDERED INSULATION
Filed July 11, 1963
FIG. 1
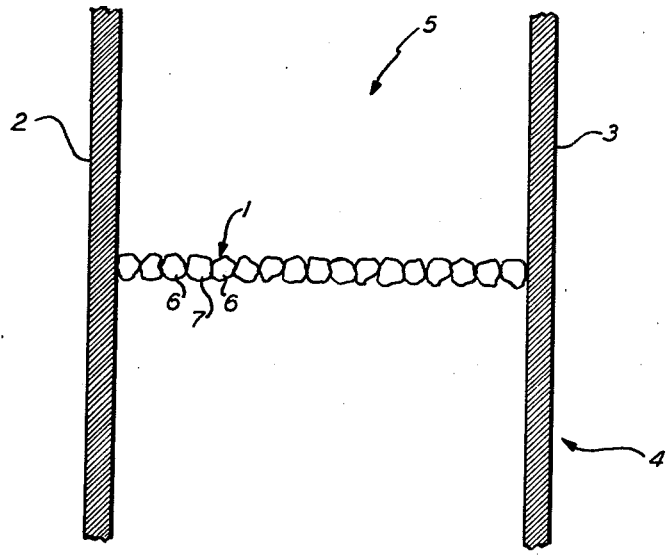
FIG. 2
FIG. 3
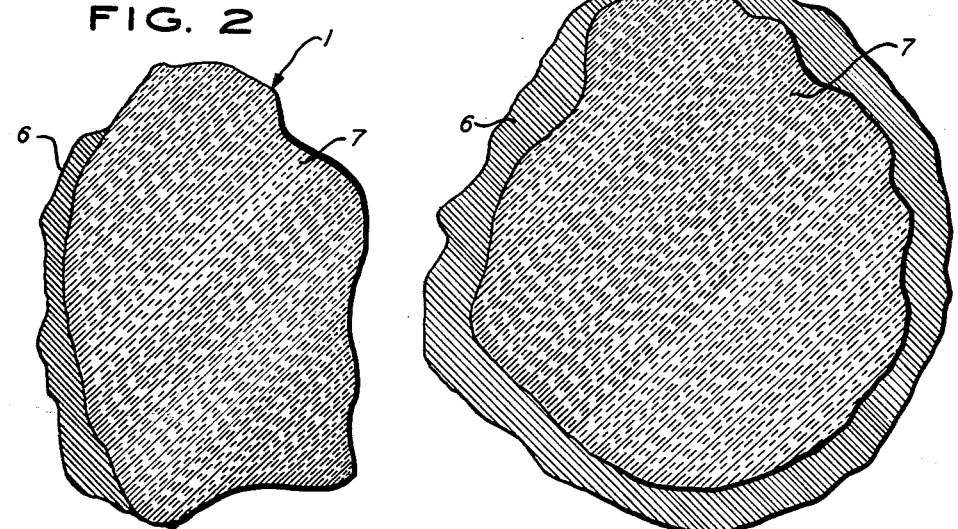
INVENTOR.
FRANCIS A. OMILIAN, JR.
BY Jonathan Plaut
ATTORNEY 3,185,334
OPACIFIED POWDERED INSULATION
Francis A. Omilian, Jr., Jersey City, N.J., assignor to Air Reduction Company, Incorporated, New York, N.Y., a corporation of New York
Filed July 11, 1963, Ser. No. 294,416
7 Claims. (Cl. 220—9)

This invention relates to improved thermal insulation, and particularly to insulation of the powder-vacuum type for containers for distribution and storage of cryogenic fluids.

Finely divided, low-density powders have been used for low-temperature insulation for a number of years. They have been employed in a vacuum and in an unevacuated environment. The increased use of cryogenic fluids, that is fluids at temperatures greatly below ambient temperature, and the corresponding increased demand for vessels for the storage and transportation of cryogenic fluids has stimulated a search for improved insulation materials and systems.

As is generally known, heat is transferred by three processes: conduction, convection, and radiation. The use of certain very small, uncoated, grain-sized insulation powders and evacuation of the insulation space in which the powders are contained results in a minimum of heat transferred by conduction and convection. However, neither the untreated powdered particle nor the fact that the space in which it is contained is evacuated significantly decrease heat transfer by radiation.

It has been proposed that insulation powders be intermixed with reflective metal flakes, which have served as radiation barriers. Theoretically, the insulation powders serve as nonconductive spaces between the metal flakes. However, it has been found that when the aggregate of the insulation powder (that is insulation particles with intermixed metal flakes) is subjected to vibration in actual service as an insulator, the heavier metal flakes shake down and settle to the lower portion of the carrying vessel. This separation of the metal flakes from the powder insulation lessens the radiation shield effect of the metal flakes, since they tend to gather in one area and not be interspaced throughout the insulation area. Furthermore, the separation of the metal flakes and the gathering of said metal flakes results in an increase in heat loss due to conduction, since the interspacing of the metal flakes by the powder insulaton is reduced.

The object of this invention is to provide an insulation material which comprises finely divided, thermally non-conductive particles opaque to heat transfer by radiation.

A further object of this invention is to provide an insulation material for a storage vessel which retains its insulating properties when subjected to movement and vibration.

A further object of this invention is to provide a storage vessel for low-temperature liquids with an insulation material, comprised of particles, that has properties for lessening heat transfer due to conduction, convection and radiation, without said material undergoing any change which impairs the insulating properties when subjected to conditions of vibration, short of those vibration conditions which will produce disintegration of the particles themselves.

A further object of the invention is to provide a novel method of reducing heat transfer due to conduction, convection, and radiation between the ambient atmosphere and the content of a vessel.

These and other objects and advantages of the invention will be pointed out or will become apparent from the following detailed description and accompanying drawing.

The instant invention provides for the use of powder having low thermal conductivity as an insulation material, which powder insulation in the preferred embodiment, is coated with a metallic substance over only a portion of the surface area there. A portion of the surface area of a substantial number of the powder particles used are coated and thus made opaque to heat transfer by radiation, so that, when used in the annular space of a vessel for storage of low-temperature fluids, e.g. cryogenic vessel, the random distribution of coated particles approaches the theoretically desired distribution of alternate layer of insulator, reflector, etc.

A lower over-all thermal conductivity is obtained in using the partially coated particle than is obtained in using untreated powder insulation in the annular space of insulated storage vessels. The coating significantly decreases heat transfer by radiation. Because of the spacing obtained through random distribution of the partially coated particles and evacuation of the insulated space, heat transfer due to conduction and convection is substantially reduced. The settling and separation which occurs when insulation powder and metallic particles are intermixed and then subjected to the vibration caused by movement over roads, railroad tracks, etc., does not occur since the metallic coating has been affixed to the particles of the powder insulation and thus said coating adheres to the particles in a substantially permanent manner.

In the preferred embodiment, the insulation particle is only coated over a portion of the surface area thereof, so that random distribution of the particles will insure that uncoated surfaces separate coated surfaces. The spacing of the coated surfaces of the particles by the uncoated surfaces results in minimum heat transfer through conduction of heat from particle to particle, since the coated surface is not continuous and does not form a metallic path across which heat transfer would take place.

A substantial number of the particles of a finely divided insulating powder, such as expanded perlite (an expanded volcanic ore having low thermal conductivity), are coated with a metal coating over a significant portion, more than one-quarter of the surface area and less than one-half in one embodiment. Aluminum, for example, may be used for such coating. The partially coated insulating particles are placed into a chamber, the chamber being formed by an outer jacket of a storage vessel and an inner wall of said vessel, said inner wall making up the wall of the storage vessel for holding a low-temperature liquefied gas. The insulation particles are introduced into the chamber manually, mechanically (for example, drawn in by a vacuum environment), or by any desired method.

The chamber preferably has a vacuum environment created therein. The arrangement of the particles is that of a random distribution. The result of said distribution is that the reflective coatings on the particles are separated by areas of said particles not coated or by uncoated particles. The finely divided particles of the insulation powder and the vacuum environment provide insulation against heat loss due to conduction and convection. The coating on the particles serves to opacify the particle and thus reduce the heat loss due to radiation. The random distribution of the particles insures the fact that the coatings over part of the surface area of the particles do not set up a chain by which heat transfer due to conduction would eventuate. The fact that the metal surface is actually coated on the insulation particle insures the relative permanence of the distribution of the reflective metal throughout the insulated area without settling of the metal in relation to the particles, as is true where separate metallic flakes are free to settle from the insulating powder.

The insulating particles also can be coated over substantially all of their surface area. The fully coated particles are then separated in the insulation space of a storage vessel for low-temperature fluids by intermixed wholly uncoated insulating particles or added partially coated particles, so as to avoid the creation of a continuous metallic surface and the resulting heat transfer by conduction. In this modification, the wholly coated insulation particles are intermixed with wholly uncoated or added partially coated insulation particles in the insulation area of a storage vessel. A vacuum environment is created in the insulation space of the storage vessel, and the coated particles are introduced into the evacuated area in the same manner as described earlier in relation to partially coated particles.

In the drawing,

FIGURE 1 shows a row of particles of an insulation powder after random distribution thereof, the size of the particles being exaggerated in order to clearly illustrate the resulting arrangement within an insulation area;

FIGURE 2 shows a sectional view, under great magnification, of a partially coated insulation particle according to the preferred form of the invention; and FIGURE 3 shows, under great magnification, a modified form of the coated particle shown in FIGURE 2.

In FIGURE 1, a single row of the particles 1, exaggerated in size for clarity, of an insulation powder having low thermal conductivity are shown deposited between the inner vessel wall 2 and the outer jacket wall 3 of the storage vessel, generally indicated by numeral 4, as they are arranged upon random distribution. Obviously, particles would be disposed throughout the annular space 5 between said inner and outer walls, but only one row resulting from random distribution is shown in order to point out the arrangement resulting from the random distribution. The walls 2 and 4 are shown in section as constructed of metal. However, other materials may be used, as desired.

At least a significant portion of the surface area of each particle is coated. The coated segment of the particle is a reflective surface, significantly decreasing heat transfer by radiation.

In FIGURE 2, showing the preferred embodiment of the invention, surface area 6 of particle 1 has been coated, while surface area 7 has not been coated. The average coating covers at least one-quarter and less than one-half of the external surface area of the particle. The thickness of the coating varies from about 100 angstroms to about 10,000 angstroms. With coatings of thickness less than about 100 angstroms reflective properties are lowered, probably because of pockets in the coating. With coatings of thickness greater than about 10,000 angstroms, the reflective properties diminish, probably because of peeling and flaking. The particles intended to be used are any of the known powdered insulations; such as: perlite, Micro-Cel, Nerex, diatomaceous earth, magnesium carbonate, silica (Cab-O-Sil), silica aerogel (Santo-Cel), lampblack, calcium silicate, peach pitts, vermiculite, silica white or Ryolex.

A substantial number of the particles of the powder insulation may be coated by introducing them into a furnace and then metalizing them by condensing a vaporized metal (such as aluminum or copper) onto the powder insulation.

One method utilized to coat a part of the surface area of an insulation particle is as follows:

In a vacuum environment, aluminum wire melted in a tungsten helical coil is placed five inches from a layer of expanded perlite, with a particle size range of 16 to 600 microns. The wire is positioned above the expanded perlite. The expanded perlite, each particle of which is generally of spherical shape with an irregular surface area, is spread out into a layer as nearly one particle thick as possible. A portion of the exposed surface of more than a majority of the particles of the expanded perlite are then coated by vapor deposition.

When expanded perlite particles were coated by the vapor deposition, approximately two-thirds of the particles received coating with aluminum metal. The average extent of coverage of each particle corresponded to one-quarter to one-third of the external surface area of the particles, and the deposited aluminum had a smooth, highly reflective appearance and conformed well to the surface contours of the particles. Upon examination of the coated particles after completion of the coating method, discussed above, it was observed that the presence of the coated particles in a vacuum environment did not adversely affect the adherence of the coating to the particle.

On the basis of microscopic examination, it was found that the coating of the insulation particles did not separate from the expanded perlite when the coated particles were subjected to the type of vibration encountered when used as an insulation material in a storage vessel which is transported over roads, railroad tracks, etc.

The method used to achieve coating of the powder insulation particles is not the subject of this invention, and any method which effects a substantially permanent coating upon the powdered insulation particle may be used.

The random distribution of the particles with an opacified metallic surface in the annular space shown in FIGURE 1, approaches the theoretically desired distribution of alternate layers of insulator, reflector, etc. This achieved random distribution allows for reflection of radiant heat, so as to cut down the heat transfer due to radiation from the outer jacket to the inner vessel, while providing for insulation between metallic reflective surfaces by the particle surfaces not coated. Thus, in FIGURE 1, coated surfaces 6 are separated by uncoated surfaces 7.

The addition of wholly uncoated particles to the annular space between the inner and outer walls of the storage vessel will result in a greater amount of insulation between particles partially coated. However, such addition is not necessary, since the random distribution attained by introducing the particles into the chamber without thought to arrangement closely approximates the desired theoretical distribution for insulation between coated surfaces.

To aid in the lessening of heat transfer between the inner vessel and the outer jacket, a vacuum pressure from $10^{-1}$ torr to $10^{-6}$ torr is created in the annular space (1 torr=1 mm. of Hg).

In a modified form shown in FIGURE 3 of the invention described above, the insulation particles 1 having low thermal conductivity are coated with a metal coating 6 over substantially the entire surface area, thereof. Said wholly coated particles are then intermixed in an evacuated annular space such as shown in FIGURE 1 with either or both wholly uncoated insulation particles and partially coated insulation particles. The resulting arrangement upon random distribution in the annular space 5 is as shown in FIGURE 1, e.g., alternate layers of insulator, reflector, etc.

When the partially coated insulating particles, according to the preferred embodiment of my invention, are transferred into the vacuum environment of the insulating area of a storage vessel, random orientation of the particles insures against continuous metal heat conducting bands, thus minimizing thermal conduction while providing increased radiant heat reflectivity due to the addition of a metal coating on part of the surface of the powder particles. The actual content of metal used to decrease heat leak due to radiation is considerably less than that required in an equally effective mixture, before shaking down, of insulating material and flake aluminum, since very thin films of metal may be deposited. In the vapor disposition method earlier described, the thickness of the coating is a factor of the time period of coating. Furthermore, the shaking down and separation of a mechanical mixture of insulating material and metal particles cannot take place in the insulation used in my invention, since the metallic coating and insulating particles are joined in a substantially permanent manner.

In the modification set forth, the mixture of wholly metal coated insulation particles in a random arrangement with both wholly or either uncoated particles and partially metal coated particles provide for an effective shield against heat transfer by radiation. Due to the random arrangement and the resulting separation of metallic surfaces, heat transfer by conduction is barred.

In actual practice vacuum deposited aluminum adhered well to expanded perlite particles, and vibration of coated expanded perlite under conditions short of disintegration of the particles themselves did not produce appreciable separation of the metal film coating.

The relative radiant heat properties of a coated insulation material (for example, expanded perlite) in comparison to the uncoated material indicates that the coating does impart increased radiant heat reflection properties to the insulating material. Test data, based on the percentage transmission of infra-red radiation bears out the above indication. Samples contained in a sodium chloride cell of constant thickness of the original (uncoated) expanded perlite and the expanded perlite coated by the vapor deposition method earlier described were compared by measuring the percentage transmission of infra-red radiation as determined with standard spectro-photometric instrumentation. The percentage transmission of infra-red radiation when using aluminum coated expanded perlite was less than one-half the percentage transmission when using uncoated expanded perlite, at 6–8 wave length region.

The coating material may be of aluminum or copper metal, as discussed earlier. Furthermore, it is to be understood that other coating materials may be used as desired.

It is to be understood that the invention is not limited to a particular powdered insulation, or method of coating, or limited to the particular storage vessel shown in FIGURE 1 and described in connection with said figure. While the form of embodiment of the invention shown in FIGURE 2 constitutes the preferred form, and the form in FIGURE 3 constitutes a modification of that shown in FIGURE 2, it is to be understood that other forms might be adopted, as may come within the scope of the claims which follow:

I claim:
1. In a vessel for the storage of low-temperature fluids, an inner vessel for holding the low-temperature fluid, an insulation space in proximity to said inner vessel, said insulation space having a vacuum environment of a range from $10^{-1}$ torr to $10^{-6}$ torr therein, an insulation powder composed of individual particles of a material having low thermal conductivity randomly distributed throughout said insulation space, a reflective metal coating covering a significant portion, but not all, of the surface area of a substantial number of the individual particles, whereby the metal coating serves to opacify the covered part of the particles and said random distribution of the opacified particles serves to reduce heat transfer by radiation, said random distribution approaching the theoretically desired distribution of insulator, reflector, insulator, reflector, etc.

2. Insulation material as set forth in claim 1, the individual particles being composed of expanded perlite insulation material.

3. In the vessel set forth in claim 1, said metal coating generally disposed over at least one-quarter of the surface area of said individual particles.

4. In the vessel set forth in claim 1, the coating being of aluminum material of a thickness varying from about 100 angstroms to about 10,000 angstroms.

5. In the vessel set forth in claim 1, the coating being of copper.

6. In the vessel set forth in claim 5, said significant portion comprising generally less than one-half of the surface area.

7. In a vessel for the storage of low temperature fluids, an inner vessel for holding the low temperature fluid, an insulation space in proximity to said inner vessel, said insulation space having a vacuum environment of a range from $10^{-1}$ torr to $10^{-6}$ torr therein, an insulation powder composed of individual particles, all composed of the same material and having low thermal conductivity, said particles randomly distributed throughout said insulation space, an aluminum coating of a thickness varying from about 100 angstroms to about 10,000 angstroms covering at least one-quarter but generally less than one-half of the surface area of a substantial number of the individual particles, whereby the coating serves to opacify the covered part of the particles and said random distribution of the partially opacified particles reduces heat transfer by radiation, said random distribution approaching the theoretically desired distribution of insulator, reflector, insulator, reflector, etc.

References Cited by the Examiner

UNITED STATES PATENTS

| 2,704,965 | 3/55 | Seybold | 117—100 |
| 2,967,152 | 1/61 | Matsch et al. | 220—9 |
| 2,999,366 | 9/61 | La Fave et al. | 220—9 |
| 3,053,683 | 9/62 | Yolles | 117—100 |
| 3,062,680 | 11/62 | Meddings | 117—100 |

THERON E. CONDON, *Primary Examiner.*